US010285154B2

(12) United States Patent
Tsai

(10) Patent No.: US 10,285,154 B2
(45) Date of Patent: May 7, 2019

(54) UE FOR LOCATION MANAGEMENT, SYSTEM MANAGEMENT SERVER FOR LOCATION MANAGEMENT AND METHOD USING THE SAME

(71) Applicant: Chiun Mai Communication Systems, Inc., New Taipei (TW)

(72) Inventor: I-Fei Tsai, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/698,670

(22) Filed: Sep. 8, 2017

(65) Prior Publication Data
US 2018/0077672 A1    Mar. 15, 2018

Related U.S. Application Data

(60) Provisional application No. 62/385,264, filed on Sep. 9, 2016.

(51) Int. Cl.
*H04W 24/00* (2009.01)
*H04W 64/00* (2009.01)
*H04W 4/029* (2018.01)
*H04W 68/02* (2009.01)
*H04W 60/04* (2009.01)
*H04W 68/04* (2009.01)
*H04W 8/02* (2009.01)
*H04W 88/02* (2009.01)

(52) U.S. Cl.
CPC .......... *H04W 64/00* (2013.01); *H04W 4/029* (2018.02); *H04W 60/04* (2013.01); *H04W 68/02* (2013.01); *H04W 68/04* (2013.01); *H04W 8/02* (2013.01); *H04W 88/02* (2013.01)

(58) Field of Classification Search
CPC ..... H04W 4/029; H04W 60/04; H04W 64/00; H04W 68/02; H04W 68/04; H04W 88/02; H04W 8/02
USPC ...................................... 455/456.1
See application file for complete search history.

(56) References Cited

U.S. PATENT DOCUMENTS

2006/0014550 A1    1/2006   Ryu et al.
2010/0075670 A1    3/2010   Wu
2011/0201353 A1    8/2011   Voehringer
(Continued)

FOREIGN PATENT DOCUMENTS

EP    2129141       12/2009
WO    2000038469    6/2000
WO    2008061459    5/2008

*Primary Examiner* — Charles T Shedrick
(74) *Attorney, Agent, or Firm* — ScienBiziP, P.C.

(57) ABSTRACT

A method for location management is illustrated. The method is executed by a user equipment (UE) associated with a network comprising a system management server. The UE receives a PCML from the system management server for the location update, wherein the PCML comprises a plurality of entries, each entry of the PCML corresponds to a paging area, each entry of the PCML comprises a paging area identity and a plurality of mask bits, each mask bit represents a cell of the paging area. The UE then creates a SCML to store mobility history of the UE. Then the UE monitors the channel quality of the neighboring cells and reselects one cell, checks whether or not the mask bit corresponding to the reselected cell is masked, and performs location update and sends the SCML to the system management server when the mask bit corresponding to the reselected cell is masked.

16 Claims, 15 Drawing Sheets

(56) References Cited

U.S. PATENT DOCUMENTS

2011/0294524 A1 12/2011 Tontinuttananon et al.
2013/0095862 A1 4/2013 Bejerano et al.
2015/0289110 A1 10/2015 Kilpatrick, II et al.

(a)LA size(paging cells)=7; location updates =4

(b)LA size(paging cells)=19; location updates =3

(a) Signaling count of paging area update (b) Signaling count reduction by the context-mapped scheme

UE FOR LOCATION MANAGEMENT, SYSTEM MANAGEMENT SERVER FOR LOCATION MANAGEMENT AND METHOD USING THE SAME

CROSS-REFERENCE TO RELATED APPLICATIONS

This application claims priority to U.S. provisional Patent Application No. 62/385,264 filed on Sep. 9, 2016, the contents of which are incorporated by reference herein.

FIELD

The subject matter herein generally relates to network management, especially relates to a User Equipment (UE) for location management by cell masking and context-mapping, and a method using the same.

BACKGROUND

Location tracking is a fundamental procedure in mobile networks. In a GSM network, for calls incoming to the UE in idle mode, the network has to wake up the UE by paging messages. Instead of paging the UE in all cells of the whole network, the network keeps tracking the UE's location using the Location Area (LA) concept. The cellular network is statically partitioned into multiple geographical regions, i.e., many LAs. Each LA contains a number of cells. The UE is designed to register to one LA at a time and perform location updates, so the distribution of paging messages can be confined to the LA where the UE most recently reported to the network. The size of the LA is a key variable in the performance of location management. A well-known tradeoff is shown in FIG. 1. The smaller the LA, the more frequent the location updates. On the contrary, a larger LA causes more paging signals. The impacts of frequent location updating are higher signaling overhead, higher paging miss rate, and higher battery consumption. To highlight the issue in common, a simulation study was conducted to evaluate the paging cost efficiency of different Paging Area (PA) cell clustering. In the simulation, the cellular network was configured as a virtual hexagonal grid, where the inter-site distance was 500 m. The PA dimensioning for a hierarchical URA scheme and a distance-based scheme (also known as UE-centric scheme) is in line with the hexagonal cell layout with different radii, as shown in FIGS. 1 and 2. In the present disclosure, the terms LA, PA, Paging Notification Area (PNA), Tracking Area (TA), UTRAN Registration Area (URA) and cell cluster are analogous and interchangeable. The number of cells in a PA with radius R is:

$$M(R) = \begin{cases} 1, & R = 1 \\ M(R-1) + 6R, & R = 1, 2, 3, \ldots \end{cases}.$$

Tens of thousands of real-world GPS traces are taken into the custom-designed computer simulation. The GPS locations in WGS 84 ellipsoid coordinate are converted to the pixels in the 2D Cartesian coordinate by an azimuthal equidistant projection where the center point is just as the GPS dataset, and then mapped to the hexagonal coordinate system. By definition, the paging cost efficiency is the ratio of the actual number of visited cells to the maximum possible number of visited cells. FIG. 3 shows the results of paging cost efficiency of the virtual distance-based and hierarchical URA schemes, with respect to different PA radii. The two dynamical location tracking schemes are on par with each. The paging cost efficiency is getting lower when the paging budget is getting higher. A finer-grained PA brings higher paging cost efficiency. The insight derived from the study is that the root cause of low paging cost efficiency is the inflexibility of cell clustering to shape the PA along the mobile trajectory, not the problem of static cell clustering. In this regard, the cell mask of PA is used to keep tracking the mobile down to the cell level, such that the maximum paging cost efficiency can be accomplished by the finest granularity.

Human or user mobility is highly regular and recurrent by nature. "Limits of predictability in human mobility, Science, 327(5968), 1018-1021" describes 93% potential predictability that can be exploited to improve the location tracking which is essential and fundamental in supporting user mobility in wireless cellular networks. In this regard, a method for location management by cell masking and context-mapping to keep tracking a UE down to a cell level is disclosed

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
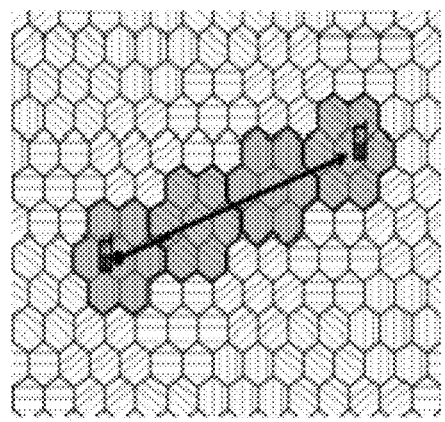
FIG. 1 is a schematic diagram of the number of location updates and paging messages in different location area size.
Figure 1:
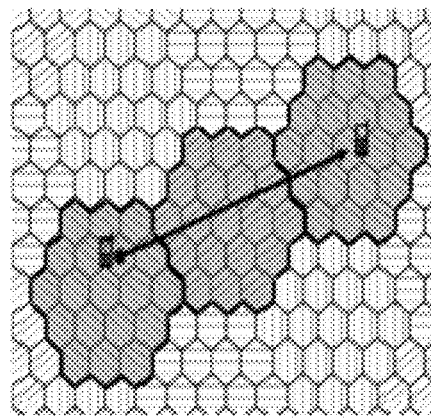
Figure 2:
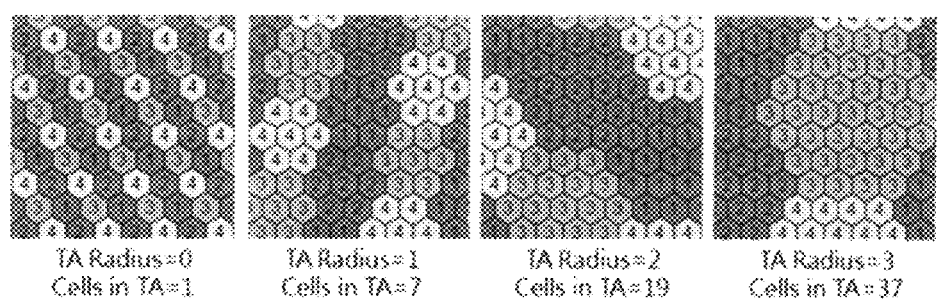
FIG. 2 is a schematic diagram of a cellular network configuration for simulation study.
Figure 3:
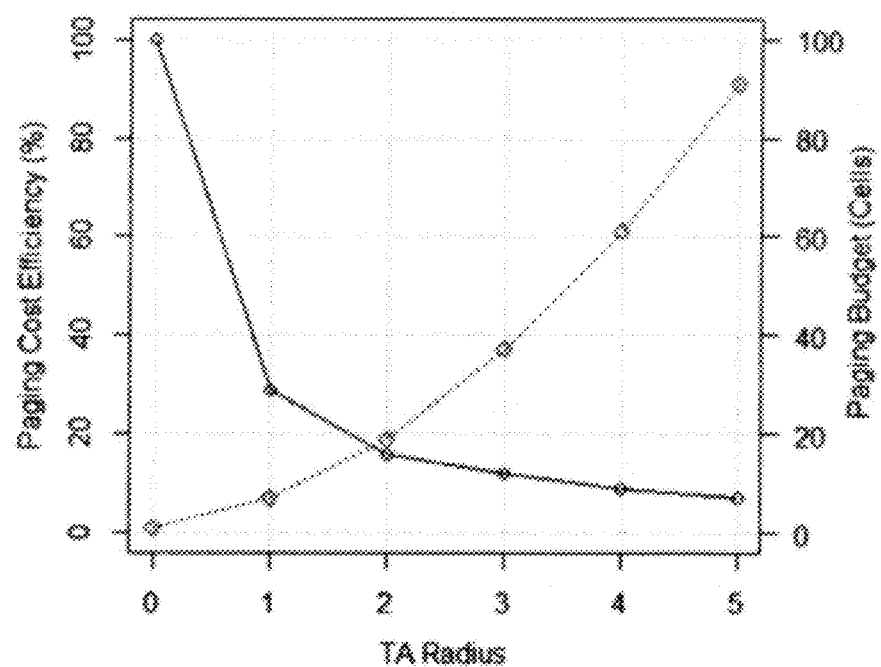
FIG. 3 is a schematic diagram of Performance of different TA dimensioning.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" indicates "including, but not necessarily limited to"; it specifically indicates open-ended inclusion or membership in a so-described combination, group, series, and the like.

Figure 4:
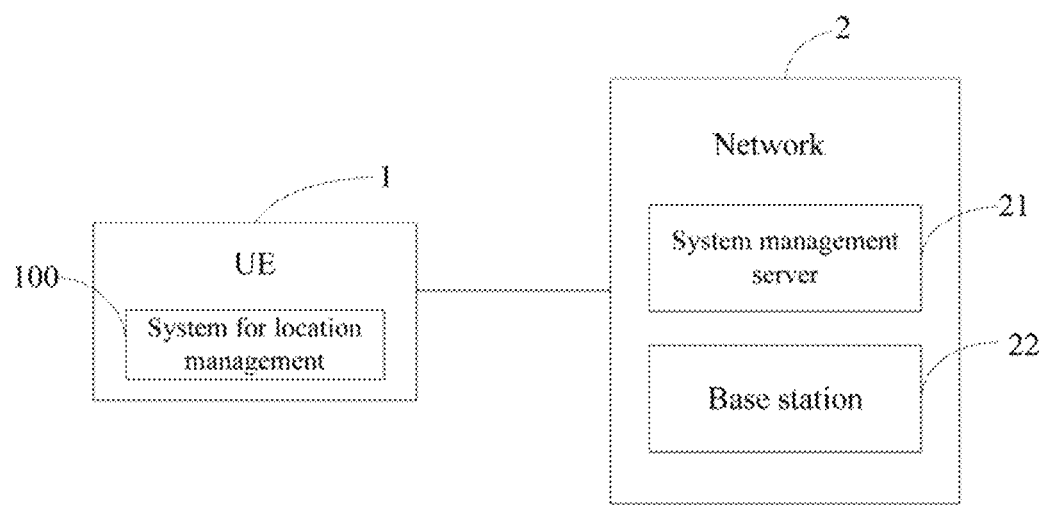
FIG. 4 is a block diagram of an embodiment of a running environment of a system for location management.

FIG. 4 illustrates an embodiment of a running environment of a system 100 for location management. The system 100 is installed in a User Equipment (UE) 1 and a system management server 21. The network 2 includes a system management server 21 and at least one base station 22. The UE 1 is connected to the network 2 by wireless communication through the at least one station 22. The UE 1 can communicate with the system management server 21 through the at least one base station 22. In at least one exemplary embodiment, the network 2 can be a cellular network. In at least one exemplary embodiment, the UE 1 can be a smart phone, a wearable device, or other suitable electronic device. The system management server 21 can be a Mobility Management Entity (MME) of a Core Network (CN), a subscriber database manager in GSM core network, or a server of a Centralized/Cloud Radio Access Network (C-RAN).

Figure 5:
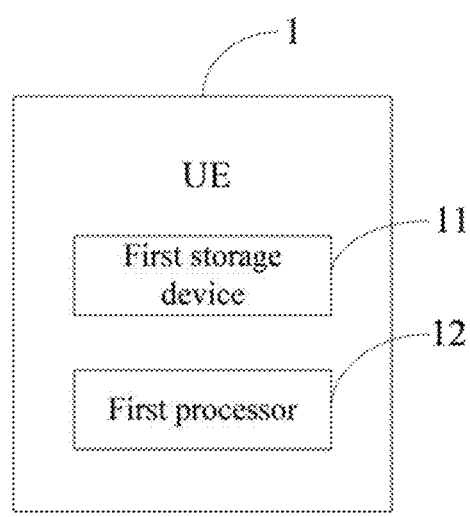
FIG. 5 is a block diagram of an embodiment of a UE in the system of FIG. 4.

FIG. 5 illustrates an embodiment of the UE 1. The UE 1 includes, but is not limited to, a first storage device 11 and a first processor 12. The first storage device 11 is used to store the data and program instructions installed in the UE 1, such as the system 100. For example, the first storage device 11 can be an internal storage system, such as a flash memory, a random access memory (RAM) for temporary storage of information, and/or a read-only memory (ROM) for permanent storage of information. In another embodiment, the first storage device 11 can also be an external storage system, such as a hard disk, a storage card, or a data storage medium. The first processor 12 is used to execute program instructions installed in the UE 1 and control the UE 1 to execute corresponding actions. In at least one exemplary embodiment, the first processor 12 can be a central processing unit (CPU), a microprocessor, or other data processor chip.

Figure 6:
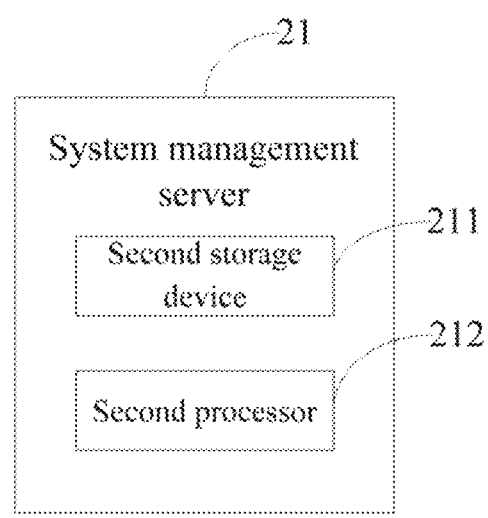
FIG. 6 is a block diagram of an embodiment of a system management server in the system of FIG. 4.

FIG. 6 illustrates an embodiment of the system management server 21. The system management server 21 includes, but is not limited to, a second storage device 211 and a second processor 212. The second storage device 211 is used to store the data and program instructions installed in the system management server 21, such as the system 100. In at least one exemplary embodiment, the second storage device 211 can be an internal storage system of the system management server 21, such as a flash memory, a random access memory (RAM) for temporary storage of information, and/or a read-only memory (ROM) for permanent storage of information. In another embodiment, the second storage device 211 can also be an external storage system, such as a hard disk, a storage card, or a data storage medium. The second processor 212 is used to execute program instructions installed in the system management server 21 and control the system management server 21 to execute corresponding actions. In at least one exemplary embodiment, the second processor 212 can be a central processing unit (CPU), a microprocessor, or other data processor chip.

Figure 7:
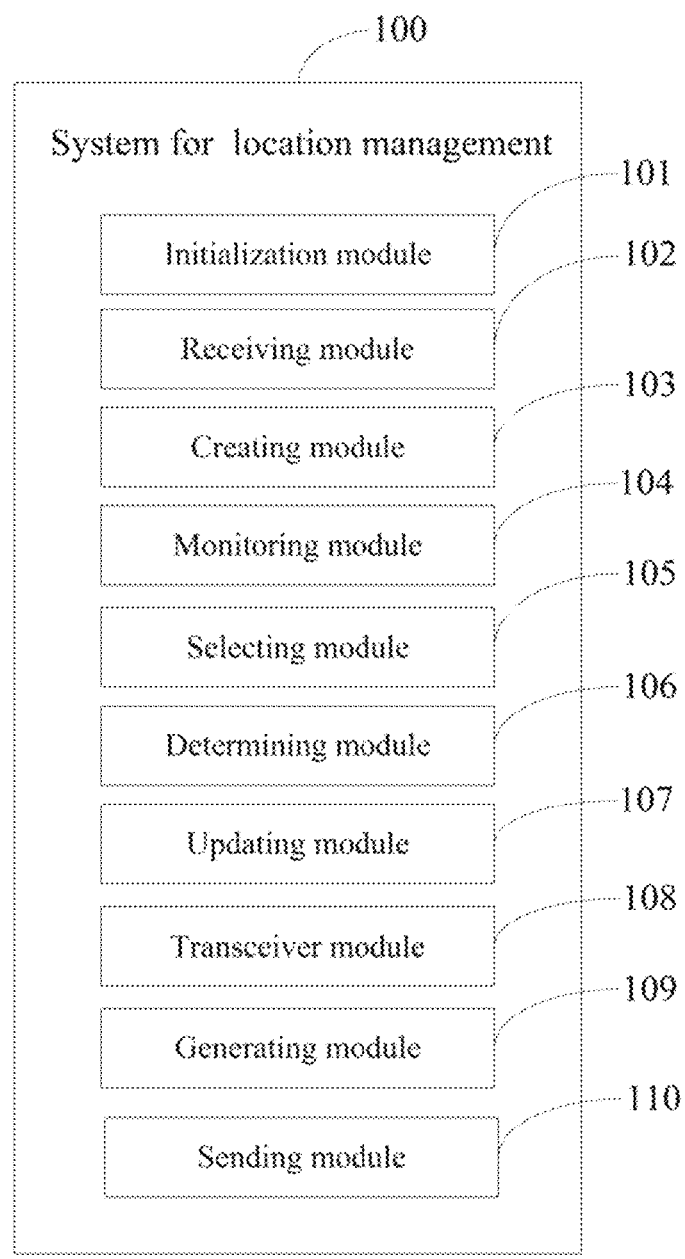
FIG. 7 is a block diagram of an embodiment of the system of FIG. 4.

FIG. 7 illustrates an embodiment of the system 100 for location management. In at least one embodiment, the system 100 includes an initialization module 101, a receiving module 102, a creating module 103, a monitoring module 104, a selecting module 105, a determining module 106, a updating module 107, a transceiver module 108, a generating module 109, and a sending module 110. The modules 101-107 of the system 100 can be collections of software instructions stored in the first storage device 11 and executed by the first processor 12 of the UE 1, the modules 108-110 of the system 100 can be collections of software instructions stored in the second storage device 211 and executed by the second processor 212 of the system management server 21.

The initialization module 101 controls the UE 1 to search a network service of a network 2 by detecting the beacon channel on certain frequency bands. In at least one exemplary embodiment, the initialization module 101 controls the UE 1 to search the service of the network 1 by detecting the beacon channel, based on the 3GPP standard.

The initialization module 101 further controls the UE 1 to select a suitable cell when the network service of the network 2 is available, and to perform authentication and registration to a system management server 21 of the network 2 through the selected cell. In at least one exemplary embodiment, the initialization module 101 controls the UE 1 to select the suitable cell based on radio resource management criteria and to perform authentication and registration to the system management server 21 based on the 3GPP standard. When the UE 1 accomplishes the authentication and registration, the system management server 21 can acquire identification information and location information of the UE 1.

In the network 2, for calls incoming to the UE 1 in idle mode, the network 2 has to wake up the UE 1 by paging messages. Instead of paging the UE in all cells of the whole network, the network keeps tracking the UE's location in a LA (Location Area). In at least one exemplary embodiment, the network 2 is statically partitioned into multiple geographical regions, for example, multiple LAs or paging areas (PAs). In at least one exemplary embodiment, the LA and the PA are interchangeable. Each LA includes a number of cells. In at least one exemplary embodiment, each cell includes a globally unique identifier. The globally unique identifier consists of a Mobile Country Code (MCC), a Mobile Network Code (MNC), a Location Area Code (LAC), and a Cell Identity (CID). Each cell broadcasts its identity (i.e., CID) as well as other system information (for example, LAC) on the beacon channel to the UE 1. So the UE 1 can know which cell it is camping on, which LA it is now, and which cells in the neighborhood it can reselect.

The receiving module 102 receives a paging cell mask list (PCML) sent by the system management server 21 for the first cycle of location update. By provisioning the PCML to the UE 1, the network 2 guides the UE 1 as to which paging cell the location update shall be executed in. In at least one exemplary embodiment, the network 2 is also statically partitioned into multiple geographical regions, such as paging areas. The paging area includes a number of cells, and the PCML includes a number of entries (referring to FIG. 8). Each entry of the PCML corresponds to one paging area. Each entry of the PCML includes a paging area identity and a number of mask bits. In at least one exemplary embodiment, each mask bit of the PCML represents one cell of the paging area.

Figure 9:
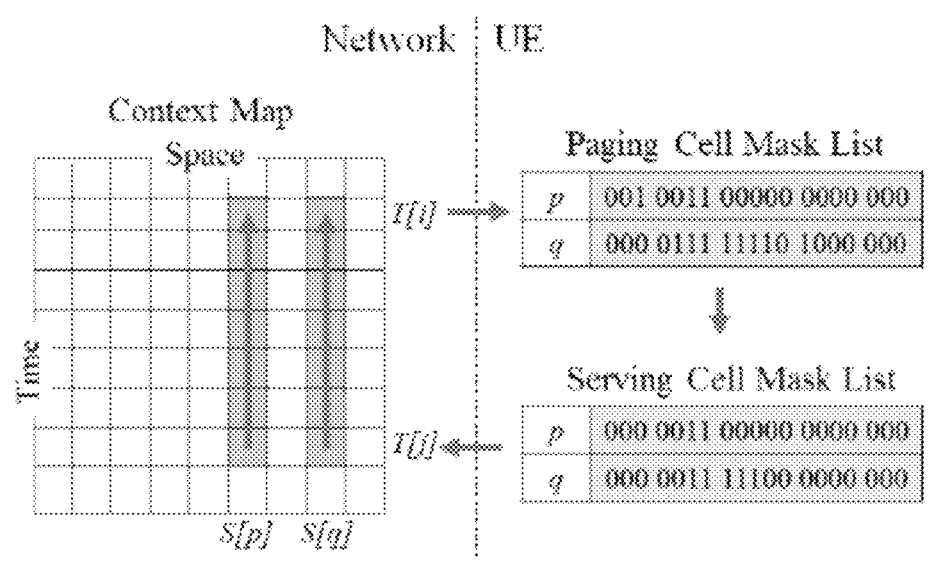
FIG. 9 is a schematic diagram of an embodiment of the SCML and a Global context Map in the system of FIG. 4.

Referring to FIG. 9, the creating module 103 creates a serving cell mask list (SCML) to store mobility history of the UE 1. In at least one exemplary embodiment, the mobility history of the UE 1 includes the cells that the UE 1 has visited since the last location update. In at least one exemplary embodiment, a cell visited by the UE 1 represents that the cell has been selected as a serving cell for the UE 1. In at least one exemplary embodiment, the creating module 103 creates the SCML to store the mobility history of the UE 1 based on the received PCML. In at least one exemplary embodiment, the SCML can be in a data format similar to that of the PCML. For example, each entry of the SCML corresponds to one paging area, each entry of the SCML includes a paging area identity and a number of mask bits, and each mask bit of the SCML represents one cell of the paging area. In at least one exemplary embodiment, the UE 1 creates an initial SCML by retaining the paging area identity of the PCML and clearing the numbers of mask bits of the PCML.

The monitoring module 104 monitors the channel quality of the neighboring cells in the network 2. In at least one exemplary embodiment, the monitoring module 104 monitors the channel quality of the neighboring cells in the network 2 for retaining the good network service from the network 2 based on the 3GPP standard. In at least one embodiment, the idle UE 1 can camp on one cell as long as the network service of the network 2 is available, and the monitoring module 104 monitors the channel quality of the neighboring cells.

The selecting module 105 reselects one cell of the network 2 in terms of radio resource management criteria. In at least one exemplary embodiment, the selecting module 105 reselects one suitable cell in terms of radio resource management criteria based on the 3GPP standard. When a cell is reselected by the selecting module 105, the cell is a serving cell for the UE 1. In at least one exemplary embodiment, the selecting module 105 monitors the neighboring cells of the network 2 and reselects a better cell to camp on so that the paging message would not be lost.

Figure 10:
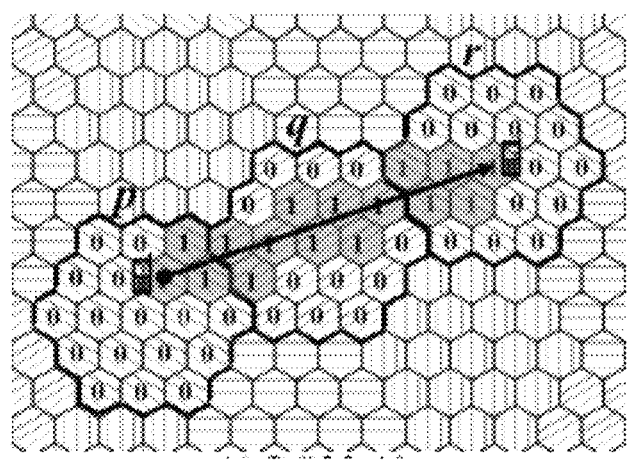
FIG. 10 is a schematic diagram of an embodiment of paging area with cell masking.

The determining module 106 checks whether or not the mask bit corresponding to the reselected cell is masked in the PCML of the current cycle of location update, so as to determine whether a location update is required. In at least one exemplary embodiment, the UE 1 performs location update in the current cycle of location update when the paging area identity of the reselected cell is not in the PCML, or when the paging area identity of the reselected cell is in the PCML but the mask bit corresponding to the reselected cell is not masked in the corresponding paging area entry of the PCML. FIG. 10 illustrates an example of three paging areas p, q and r with their mask bits imposed on the corresponding cells. In at least one exemplary embodiment, when the mask bit corresponding to one cell is 0, it means that the cell is not masked and a location update for the UE 1 is required when the UE 1 is located in the cell corresponding to the mask bit with the value of 0. When the mask bit corresponding to one cell is 1, it means that the cell is masked and a location update for the UE 1 is not required when the UE 1 is located in the cell corresponding to the mask bit with the value of 1.

The updating module 107 masks the mask bit of the cell in the SCML of the current cycle of location update when the mask bit corresponding to the reselected cell is masked in the PCML of the current cycle of location update. In at least one exemplary embodiment, when a cell is visited by the UE 1, the updating module 107 masks the mask bit of the cell in the SCML of the current cycle of location update. When the cell is not visited by the UE 1, the updating module 107 does not mask the mask bit of the cell in the SCML of the current cycle of location update. In at least one exemplary embodiment, when the cell is visited by the UE 1, the updating module 107 sets the mask bit of the cell as 1 (masked) in the SCML of the current cycle of location update.

When the mask bit corresponding to the reselected cell is not masked in the PCML of the current cycle of location update, the updating module 107 controls the UE 1 to perform location update and send the masked SCML of the current cycle of location update to the system management server 21. In at least one exemplary embodiment, by sending the SCML to the system management server 21 of the network 2, the UE 1 can let the network 2 know which cell has been visited. In at least one exemplary embodiment, for every cell, where the UE 1 has ever camped on in idle mode or light-connected mode or has ever been served in the connected mode, the updating module 107 marks the mask bit of the cell in the SCML. At the end of the location update cycle, the updating module 107 controls the UE 1 to send the masked SCML (i.e., a local context map) to the system management server 21 of the network 2 when the system management server 21 has sent a request for the SCML to the UE 1. In at least one exemplary embodiment, the system management server 21 can trace the serving cells of the UE 1 to generate the PCML when the UE 1 is in the connected mode. The SCML is optional to the system management server 21 when the system management server 21 can trace the serving cells of the UE 1.

The transceiver module 108 receives the SCML for the current cycle of location update from the UE 1, wherein the SCML stores mobility history of the UE 1.

The generating module 109 generates a context-mapped PCML for the next cycle of location update, wherein the context-mapped PCML includes a number of entries, each entry of the target PCML corresponds to a paging area, and each paging area includes a number of cells. In another embodiment, the generating module 109 can generate the context-mapped PCML for the next cycle of location update without the SCML by tracing the serving cells of the UE 1.

The sending module 110 sends the context-mapped PCML to the UE1, and sends paging messages for the UE 1 to the cells in the context-mapped PCML based on a cell-level granularity. In at least one exemplary embodiment, in response to the UE's location update, the sending module 110 sends the context-mapped PCML to the UE 1 and requests the SCML from the UE 1 to acquire the SCML of cells where the UE 1 has been located in the last location update cycle. In at least one exemplary embodiment, the sending module 110 sends the paging messages for the UE 1 only to the cells whose mask bits in the PCML are masked. To determine which cells of the updated PCML should be masked, the system management server 21 maintains a global context map. In at least one exemplary embodiment, the global context map can be regard as a space-time bitmap representing the recurrent spatiotemporal context profile of the UE (referring to FIG. 9), which can be implemented by database. The global context map has a number of paging areas on the spatial dimension and a series of time frames on the temporal dimension. The global context map records the cells that the UE 1 visited in the series of time frames. The SCML obtained from the location update procedure are merged into the global context map.

In at least one exemplary embodiment, when a location update cycle spans from time frame T[i] to T[j], then its corresponding local context map will be consolidated to the global context map from T[i] to T[j], which forms the updated PCML. For example, when the mask bit of one cell of the SCML are masked, then the cells of the global context map from T[i] to T[j] corresponding to the cell of the SCML is marked 1. By merging the SCML into the global context map, the network 2 is able to map out the UE's recurrent trajectory. In at least one exemplary embodiment, the paging cells of the PCML covering the UE's next mobile trajectory in the next recurrence can be streamlined in the PCML on an as-needed basis (referring to FIG. 10). As a result, the paging messages for those cells not covering the mobile trajectory of the UE can be eliminated.

The receiving module 102 further receives a context-mapped PCML sent by the system management server 21 for the next cycle of location update.

The creating module 103 updates the SCML for the next cycle of location update. In every cycle of location update, initially all mask bits in the SCML are reset to 0 (not masked). In at least one exemplary embodiment, the creating module 109 masks the mask bit of the cell to 1 in the SCML of the current cycle of location update when the cell was visited by the UE 1.

To achieve high space efficiency, a compact cell numbering scheme is required. The physical cell ID of Long Term Evolution (LTE) is exploited in the short range [0, 503] where only 9 bits are sufficient to identify a cell in one paging area as long as there is no duplicate cell ID in the paging area. For example, to deploy cell clustering R=3 in a hexagonal cell layout, it takes 6 bits of 9 to address 37 cells per paging area. The remaining 3 bits can be used as the local paging area ID, for up to 8 paging areas in one TA. The compact cell identifier can be programmed in such a way that the geographically base stations (such as eNBs) share the same identifier prefix as the paging area ID, and a subnet mask is used to distinguish the cluster ID from the cell ID. The base station broadcasts each cell's 9-bit physical cell ID. When the UE 1 visits one cell due to cell reselection or handover, the UE 1 masks the mask bit of the new serving cell based on the new serving cell's 9-bit physical cell ID.

Figure 8:
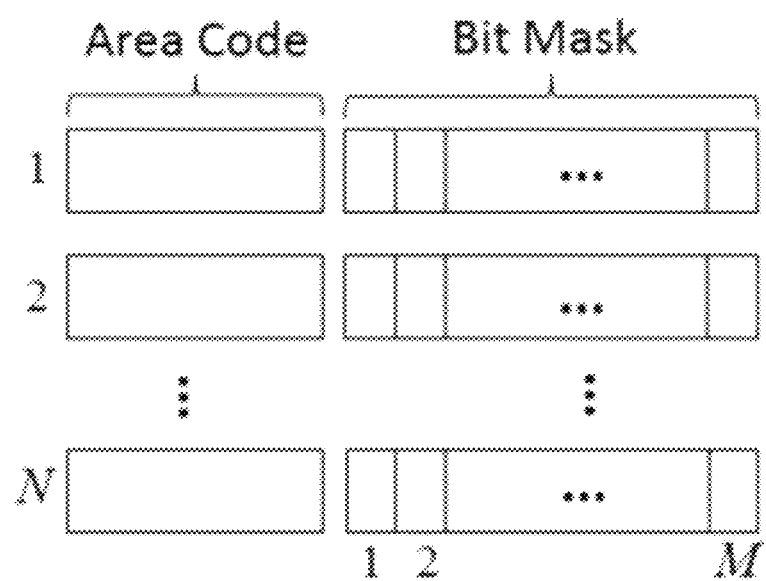
FIG. 8 is a schematic diagram of an embodiment of a PCML in the system of FIG. 4.

The PCML is designed such that it is no longer than the TAL, i.e., 98 bytes. As shown in FIG. 8, a cell mask list has one or more entries. Each entry consists of one paging area IN and one bit mask. Let M(R) be the number of cells in one cluster (paging area) with respect to hexagonal cell cluster radius R. The maximum number of clusters N(R) in one PCML is constrained by the bit width of the local cluster ID and the 98-byte maximum signaling unit size, wherein $$N(R) = \min\left\{2^{X(R)}, \left\lfloor \frac{98 \times 8}{5 \times 8 + X(R) + Y(R)} \right\rfloor\right\},$$

X(R) is the bit width of the local cluster ID based on compact cell numbering by 9-bit LTE physical cell ID.

$$X(R) = \begin{cases} 9, & R = 0 \\ 9 - \lceil \log_2^{Y(R)} \rceil, & R = 1, 2, 3, \ldots \end{cases},$$

Figure 11:
FIG. 11 is a schematic diagram of configuration table of cell masking in the hexagonal model.

Y(R) is the bit width of the cell mask.

$$Y(R) = \begin{cases} 0, & R = 0 \\ M(R), & R = 1, 2, 3, \ldots \end{cases},$$

the maximum signaling unit size, denoted by L(R), in bytes will be L(R)=(5×8+X(R)+Y(R)×N(R)/8. The case of single-cell clustering (i.e., R=0) is equivalent to the cell identifier list. There is no cell mask. The global cluster ID is exactly the global cell identifier which is 43 bits. If R=3, then there are up to 8

$$\left(N(R) = \min\left\{2^3, \left\lfloor \frac{98 \times 8}{5 \times 8 + 3 + 37} \right\rfloor\right\}\right)$$

entries in one PCML. The unit size of signaling is 80 bytes. The configuration of cell masking in the hexagonal model is summarized in Table S1 (referring to FIG. 11). Mobility predictability has a limit, so does the paging bandwidth. The capacity of one PCML, denoted by C(R) is defined as the maximum paging budget; that is, C(R)=M(R)×N(R).

The PCML is designed to geographically scalability of one PCML for covering the mobile trajectory can be approximately quantified by the cluster diameter (2R+1) times the number of Clusters (N(R), that is D(R)=(2R+1)× N(R). If the UE-specific paging area configuration is not geographically scalable, the UEs in high mobility have to perform location update frequently. To evaluate the performance, here the high-speed train is considered as the maximum human mobility in both degree and scale. The UE at a speed of 500 km/h should update location every 3.36 minutes if (R, N)=(3, 8) and the Inter Site Distance is 500 m. In such as a case, the upper bound of displacement D(3) is 56 cells in a row, and the capacity C(3) is 296 cells in one update cycle.

To evaluate the effectiveness of context-mapped user mobility as a predictor, the average paging cost efficiency of PCML is taken as a quantitative indicator. For UE 1 in one location update cycle, let α be the number of visited cells, β be the number of masked cells in PCML, then the ratio α/β is a performance metric of PCML optimization. The value of α is the number of masked bits in SCML, derived from context mapping with UE assistance. The value of β is the number of masked cells in PCML, ie., the paging budget projected by the normalized mobility degree and bounded by the mobility predictability. The formula of budget projection is system-specific because the cost function for minimizing the total cost of location updates and paging is different from network to network. The global context map for mobility statistics is a good reference to optimize the paging budget in different time frames.

Figure 12:
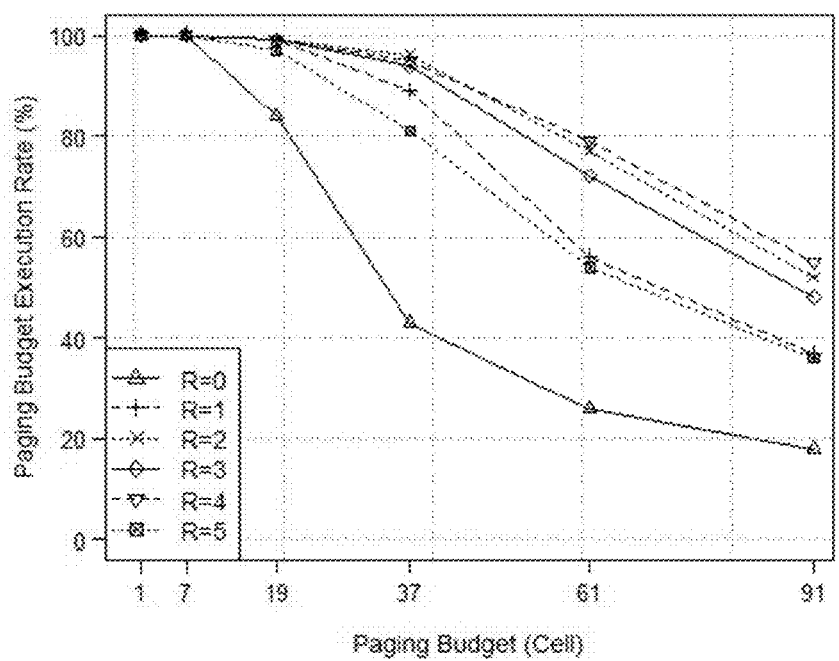
FIG. 12 is a schematic diagram of performance of context mapping in the system of FIG. 4.

The cost efficiency of context-mapped PCML optimized by batch algorithm in hindsight can always be 100%. However, due to the limitation of a maximum number of paging areas per cell mask list (for example N in table 1), the actual number of masked cells in PCML may be less than the planned paging budget. The number of paging areas being included in PCML may be less than the planned paging budget. In other words, the number of paging areas being included in PCML may exceed its maximal value before the number of masked cells in PCML exceeds the paging budget. In such a circumstance, the paging budget implementation rate cannot reach 100% like the paging cost efficiency. The result of the simulated problem is shown in FIG. 12. The paging budget implementation rate is getting lower as the paging budget is getting higher.

Figure 13:
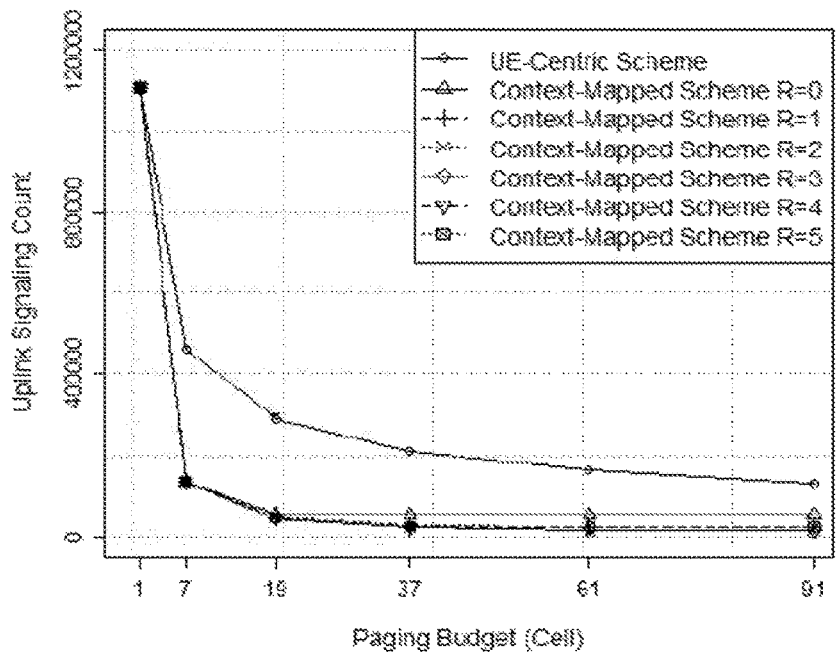
FIG. 13 is a schematic diagram of performance of different tracking schemes.
Figure 13:
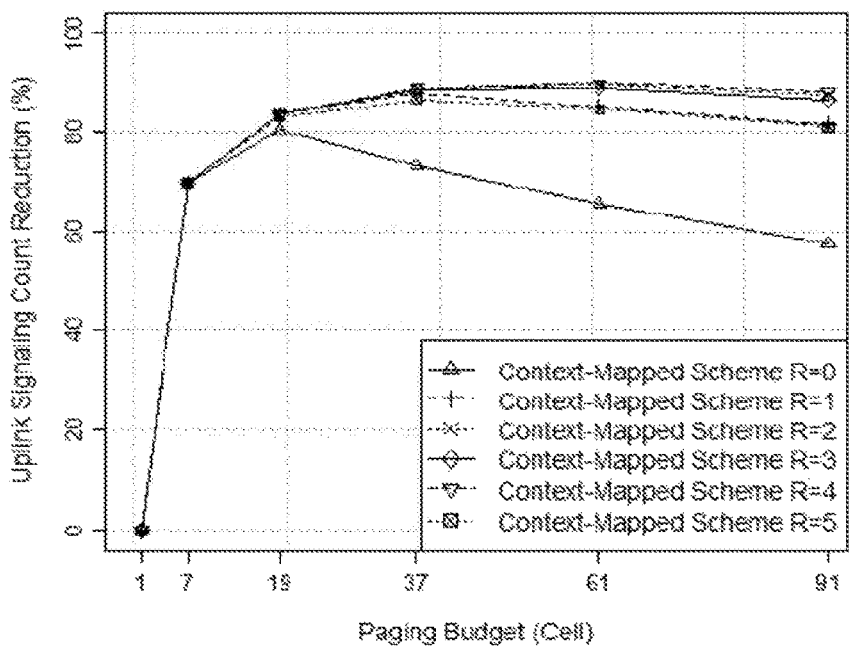

The impact of less paging budget implementation is the increase of number of location updates. Fortunately, as shown in FIG. 13 the impact is very limited. The potential cost saving of the context-mapped tracking scheme against the UE-centric tracking scheme is up to 90%.

Figure 14:
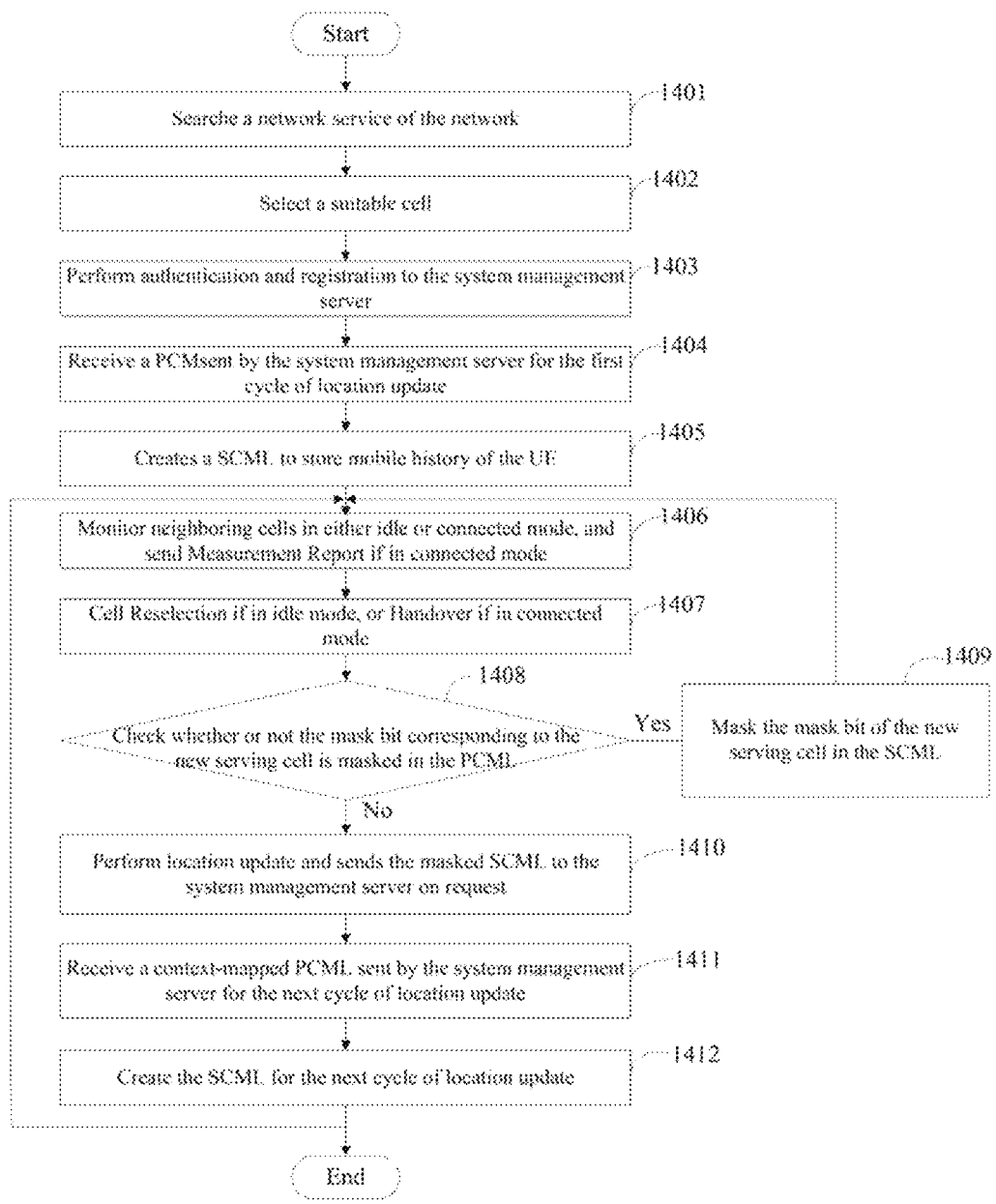
FIG. 14 is a flowchart of an embodiment of method for location management on UE side.

FIG. 14 illustrates a flowchart of method for location management. The method is executed by a user equipment (UE) associated with a network comprising a system management server. The method is provided by way of example, as there are a variety of ways to carry out the method. Each block shown in FIG. 14 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 1401.

At block 1401, the UE (User Equipment) searches a network service of the network by detecting the beacon channel on certain frequency bands. In at least one exemplary embodiment, the UE searches the network service of the network by detecting the beacon channel on certain frequency bands based on the 3GPP standard. The network can be a cellular network.

At block 1402, the UE selects a suitable cell when the network service of the network is available. In at least one exemplary embodiment, the UE selects the suitable cell in terms of radio resource management criteria based on the 3GPP standard.

At block 1403, The UE performs authentication and registration to the system management server. In at least one exemplary embodiment, the UE performs authentication and registration to the system management server based on the 3GPP standard. The system management server can be a subscriber database manager in GSM core network. When the UE accomplishes the authentication and registration, the system management server can acquire identification information and location information of the UE.

At block 1404, the UE receives a PCML (paging cell mask list) sent by the system management server for the first cycle of location update. According to the cell mask list in the PCML, whenever the UE reselects a cell, it can determine whether a location update is required. In at least one exemplary embodiment, the LA or a paging area (PA) includes a number of cells, the PCML includes a number of entries (referring to FIG. 8). Each entry of the PCML corresponds to one paging area. Each entry of the PCML includes a paging area identity and a number of mask bits. In at least one exemplary embodiment, each mask bit represents a cell of the paging area. When the mask bit corresponding to one cell is 0, it means a location update for the UE is required when the UE is located in the cell corresponding to the mask bit with the value of 0. When the mask bit corresponding to one cell is 1, it means a location update for the UE is not required when the UE is located in the cell corresponding to the mask bit with the value of 1. By provisioning the PCML to the UE, the network guides the UE as to which paging cell the location update shall be executed in.

At block 1405, the UE creates a SCML (serving cell mask list) to store mobility history of the UE. In at least one exemplary embodiment, the mobility history of the UE includes the cells that the UE has visited due to cell reselection or handover since the last location update. In at least one exemplary embodiment, the UE creates the SCML to store the mobility history of the UE based on the received PCML. In at least one exemplary embodiment, the SCML can be in a data format similar to that of the PCML. For example, each entry of the SCML corresponds to one paging area, each entry of the SCML includes a paging area identity and a number of mask bits, and each mask bit of the SCML represents one cell of the paging area. In at least one exemplary embodiment, the UE creates the SCML by retaining the paging area identity of the PCML and clearing the number of mask bits of the PCML.

At block 1406, the UE monitors the channel quality of the neighboring cells. In at least one exemplary embodiment, the UE monitors the channel quality of the neighboring cells for retaining the good network service from the network based on the 3GPP standard. In at least one exemplary embodiment, the UE in idle mode can camp on one cell as long as the network service is available, and monitor the channel quality of the neighboring cells for retaining the good network service. In connected mode, the UE monitors the channel quality of neighboring cells and sends measurement report to the network based on the monitoring.

At block 1407, the UE reselects one cell in terms of radio resource management criteria. In at least one exemplary embodiment, the UE reselects one suitable cell (also known as the reselected cell or the new serving cell) in terms of radio resource management criteria based on the 3GPP standard. The UE monitors the neighboring cells and reselects a better cell to camp on so that the paging message would not be lost. This procedure is known as cell reselection in idle mode or light-connected mode or known as handover in connected mode.

At block 1408, the UE checks whether or not the mask bit corresponding to the new serving cell is masked in the PCML of the current cycle of location update, so as to determine whether a location update is required. In at least one exemplary embodiment, the UE performs location update when the paging area identity of the new serving cell is not in the PCML, or when the paging area identity of the new serving cell is in the PCML but the mask bit corresponding to the new serving cell is not masked in the corresponding paging area entry. Otherwise, it is determined that a location update is not required. In at least one exemplary embodiment, when the network needs to page the UE, the network only send paging messages to the cells whose mask bits of the paging area entry in the PCML are masked. In at least one exemplary embodiment, when it is determined that a location update is not required, the method executes block 1409, otherwise, the method executes block 1410.

At block 1409, the UE masks the mask bit of the new serving cell in the SCML of the current cycle of location update to record the new serving cell in the SCML.

At block 1410, the UE performs location update and sends the masked SCML of the current cycle of location update to the system management server on request. In at least one exemplary embodiment, by sending the SCML to the network, the UE can let the network know which cells have been visited by the UE. In at least one exemplary embodiment, for every cell, where the UE has ever camped on in idle mode or served in connected mode or light-connected mode, the UE masks the mask bit of the cell in the SCML. At the end of the location update cycle, the UE sends the SCML (i.e., a local context map) to the network when the system management server has sent a request for the SCML to the UE. In at least one exemplary embodiment, the system management server can trace the serving cells of the UE to generate the PCML when the UE is in the connected mode. In at least one exemplary embodiment, at block 1410, the UE only performs location update.

At block 1411, the UE receives a context-mapped PCML sent by the system management server for the next cycle of location update.

At block 1412, the UE creates the SCML for the next cycle of location update. In every cycle of location update, initially the UE resets all mask bits in the SCML to 0 (not masked).

In at least one exemplary embodiment, the blocks 1405, 1409 and 1412 can be omitted when the system management server can generate the PCML without the SCML by tracing the serving cells of the UE.

Figure 15:
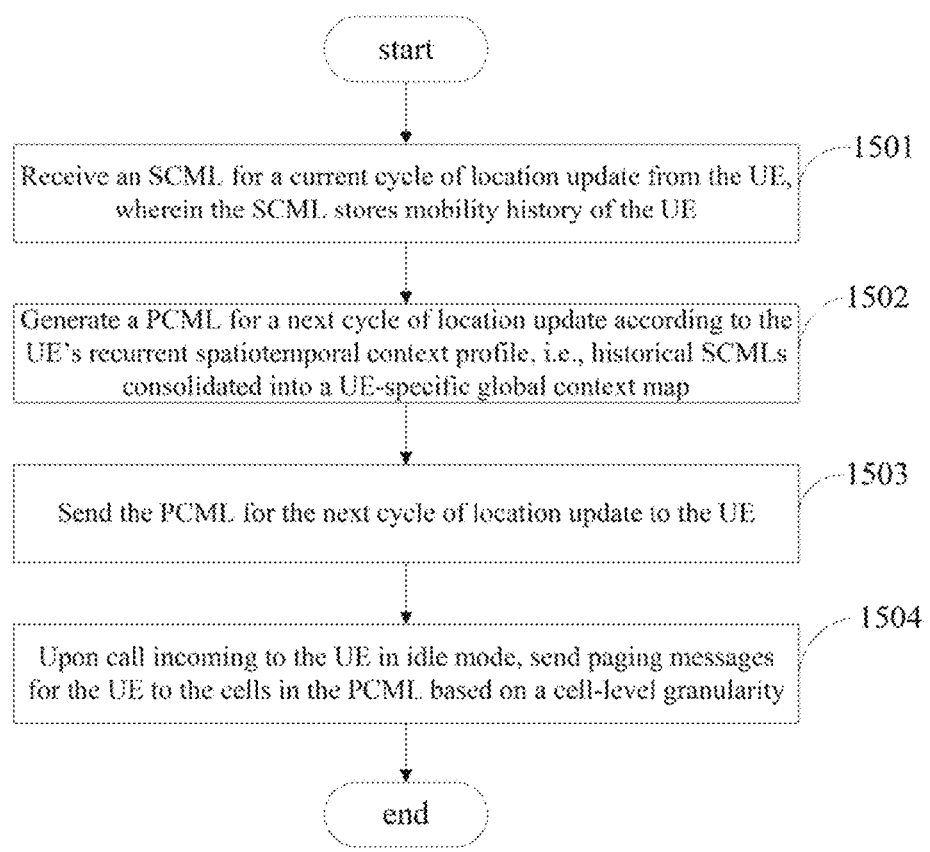
FIG. 15 is another flowchart of an embodiment of method for location management on network server side.

FIG. 15 illustrates a flowchart of method for location management. The method is executed by a system management server of a network associated with a UE. The method is provided by way of example, as there are a variety of ways to carry out the method. Each block shown in FIG. 15 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 1501.

At block 1501, the system management server receives an SCML for a current cycle of location update from the UE, wherein the SCML stores mobility history of the UE.

At block 1502, the system management server generates a PCML for a next cycle of location update, optionally, according to the SCML of the current cycle of location update and the SCMLs of previous cycles of location update, wherein the PCML includes a number of entries, each entry of the PCML corresponds to a paging area, and each paging area includes a number of cells.

At block 1503, the system management server sends the PCML for the next cycle of location update to the UE.

At block 1504, upon call incoming to the UE in idle mode, the system management server sends paging messages for the UE to the cells in the PCML based on a cell-level granularity instead of a paging-area-level granularity.

In at least one exemplary embodiment, in response to the UE's location update, the system management server sends the context-mapped PCML to the UE and requests the SCML from the UE to acquire the SCML of cells where the UE ever located in the last location update cycle. To determine which cells of the PCML should be masked, the system management server maintains a global context map. In at least one exemplary embodiment, the global context map can be regard as a space-time bitmap representing the recurrent spatiotemporal context profile of the UE (referring to FIG. 9), which can be implemented by database. The global context map has a number of cell clusters on the spatial dimension and a series of time frames on the temporal dimension. The global context map records the cells that the UE visited in the series of time frames. The SCML obtained from the location update procedure are merged into the global context map.

In at least one exemplary embodiment, when a location update cycle spans from time frame T[i] to T[j], then its corresponding local context map will be consolidated to the global context map from T[i] to T[j], which forms the context-mapped PCML. For example, when the mask bit of one cell of the SCML is masked, then the cells of the global context map from T[i] to T[j] corresponding to the cell of the SCML is marked 1. By merging the SCML into the global context map, the network is able to map out the UE's recurrent trajectory. In at least one exemplary embodiment, the paging cells of the context-mapped PCML covering the UE's mobile trajectory in the next recurrence can be streamlined in the PCML on an as-needed basis. As a result, the paging messages used to be delivered to those cells not covering the mobile trajectory of the UE can be literally eliminated.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A method for location management, executed by a user equipment (UE) associated with a network comprising a system management server, the method comprising:
receiving a paging cell mask list (PCML) sent by the system management server for a current cycle of location update, wherein the PCML comprises a plurality of entries, each of the plurality of entries of the PCML corresponds to a paging area comprising a plurality of cells, wherein each of the plurality of entries of the PCML comprises a paging area identity and a plurality of mask bits, each of the plurality of mask bits representing a cell of the paging area;
on cell reselection or handover from a previous serving cell to a new serving cell, checking whether location update is required according to the new serving cell and the PCML of the current cycle of location update, wherein it is determined that location update is required if a paging area identity of the new serving cell is not in the PCML, or if the paging area identity of the new serving cell is in the PCML but the mask bit corresponding to the new serving cell in the PCML is unmasked, otherwise it is determined that location update is not required; and
performing location update when it is determined that location update is required.

2. The method according to claim 1, further comprising:
creating a serving cell mask list (SCML) for the current cycle of location update to store mobility history of the UE;

recording the new serving cell in the SCML of the current cycle of location update when it is determined that location update is not required; and sending the SCML of the current cycle of location update to the system management server when it is determined that location update is required.

3. The method according to claim 2, wherein the mobility history of the UE comprises the cells that the UE have ever visited since the last location update, the SCML comprises a plurality of entries, each of the plurality of entries of the SCML corresponds to one paging area, each of the plurality of entries of the SCML comprises a paging area identity and a plurality of mask bits, each of the plurality of mask bits of the SCML represents one cell of the paging area, and the new serving cell is recorded in the SCML by masking the mask bit of the new serving cell in the SCML.

4. The method according to claim 3, further comprising:
receiving a compact cell identity of the new serving cell from a broadcast for the new serving cell, wherein the compact cell identity comprises a paging area identity and a local cell identify, the scope of the local cell identity is within the paging area associated with the paging area identity, the local cell identity is used to index the mask bit of the new serving cell in the SCML to mask the mask bit of the new serving cell.

5. The method according to claim 2, further comprising:
receiving a PCML send by the system management server for a next cycle of location update, wherein the PCML is generated by the system management server according to the SCML and a recurrent spatiotemporal context profile of the UE; and
creating an SCML to store mobility history of the UE for the next cycle of location update.

6. A method for location management, executed by a network associated with a user equipment (UE), the method comprising:
generating a paging cell mask list (PCML) according to a recurrent spatiotemporal context profile of the UE, wherein the PCML comprises a plurality of entries, each of the plurality of entries of the PCML corresponds to a paging area, and each of the paging area comprises a plurality of cells, wherein each of the plurality of entries of the PCML comprises a plurality of mask bits, each of the plurality of mask bits representing a cell of a paging area in the PCML;
sending the PCML to the UE; and
upon call incoming to the UE in idle mode, sending paging messages for the UE to the cells whose mask bits in the PCML are masked.

7. The method according to claim 6, further comprising:
receiving a serving cell mask list (SCML) from the UE, wherein the SCML stores mobility history of the UE, the PCML is generated according to the recurrent spatiotemporal context profile incorporating the SCML.

8. The method according to claim 7, further comprising:
maintaining a global context map, wherein the global context map comprises the recurrent spatiotemporal context profile of the UE by recording cells the UE visited in a series of time frames;
merging the SCML received from the UE into the global context map; and
generating the PCML according to the global context map.

9. A user equipment (UE) for location management, communicated with a system management server of a network, comprising:

a processor; and
a non-transitory storage medium coupled to the processor and configured to store a plurality of instructions, which cause the UE to:
receive a paging cell mask list (PCML) sent by the system management server for a current cycle of location update, wherein the PCML comprises a plurality of entries, each of the plurality of entries of the PCML corresponds to a paging area, and each of the paging area comprises a plurality of cells, wherein each of the plurality of entries of the PCML comprises a paging area identity and a plurality of mask bits, each of the plurality of mask bits representing a cell of the paging area;
on cell reselection or handover from a previous serving cell to a new serving cell, check whether location update is required according to the new serving cell and the PCML of the current cycle of location update, wherein it is determined that location update is required if a paging area identity of the new serving cell is not in the PCML, or if the paging area identity of the new serving cell is in the PCML but a mask bit corresponding to the new serving cell in the PCML is unmasked, otherwise it is determined that location update is not required; and
perform location update when it is determined that location update is required.

10. The UE according to claim 9, wherein the plurality of instructions is further configured to cause the UE to:
create a serving cell mask list (SCML) for the current cycle of location update to store mobility history of the UE;
record the new serving cell in the SCML of the current cycle of location update when it is determined that location update is not required; and
send the SCML of the current cycle of location update to the system management server when it is determined that location update is required.

11. The UE according to claim 10, wherein the mobility history of the UE comprises the cells that the UE have ever visited since the last location update, the SCML comprises a plurality of entries, each of the plurality of entries of the SCML corresponds to one paging area, each of the plurality of entries of the SCML comprises a paging area identity and a plurality of mask bits, each of the plurality of mask bits of the SCML represents one cell of the paging area, and the new serving cell is recorded in the SCML by masking the mask bit of the new serving cell in the SCML.

12. The UE according to claim 11, wherein the plurality of instructions is further configured to cause the UE to:
receive a compact cell identity of the new serving cell from a broadcast for the new serving cell, wherein the compact cell identity comprises a paging area identity and a local cell identify, the scope of the local cell identity is within the paging area associated with the paging area identity, the local cell identity is used to index the mask bit of the new serving cell in the SCML to mask the mask bit of the new serving cell.

13. The UE according to claim 10, wherein the plurality of instructions is further configured to cause the UE to:
receive a PCML send by the system management server for a next cycle of location update, wherein the PCML is generated by the system management server according to the SCML and a recurrent spatiotemporal context profile of the UE; and
create an SCML to store mobility history of the UE for the next cycle of location update.

14. A system management server for location management, communicated with a user equipment (UE), comprising:
- a processor; and
- a non-transitory storage medium coupled to the processor and configured to store a plurality of instructions, which cause the system management server to:
    - generate a paging cell mask list (PCML) according to a recurrent spatiotemporal context profile of the UE, wherein the PCML comprises a plurality of entries, each of the plurality of entries of the PCML corresponds to a paging area, and each of the paging area comprises a plurality of cells, wherein each of the plurality of entries of the PCML comprises a plurality of mask bits, each of the plurality of mask bits representing a cell of a paging area in the PCML;
    - send the PCML to the UE; and
    - upon call incoming to the UE in idle mode, send paging messages for the UE only to the cells whose mask bits in the PCML are masked only to the cells whose mask bits in the PCML are masked.

15. The system management server according to claim 14, wherein the plurality of instructions is further configured to cause the system management server to:
- receive a serving cell mask list (SCML) from the UE, wherein the SCML stores mobility history of the UE, the PCML is generated according to the recurrent spatiotemporal context profile incorporating the SCML.

16. The system management server according to claim 15, wherein the plurality of instructions is further configured to cause the system management server to:
- maintain a global context map, wherein the global context map comprises the recurrent spatiotemporal context profile of the UE by recording cells the UE visited in a series of time frames;
- merge the SCML received from the UE into the global context map; and
- generate the PCML according to the global context map.

* * * * *